(12) United States Patent
Petrén et al.

(10) Patent No.: US 11,774,310 B2
(45) Date of Patent: Oct. 3, 2023

(54) PRESSURE SENSOR SYSTEM FOR CHARGE AIR LOAD CONTROL

(71) Applicant: Volvo Car Corporation, Gothenburg (SE)

(72) Inventors: Anders Petrén, Kärna (SE); Jan Dahlgren, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/859,171

(22) Filed: Jul. 7, 2022

(65) Prior Publication Data

US 2023/0016442 A1    Jan. 19, 2023

(30) Foreign Application Priority Data

Jul. 9, 2021 (EP) .................................... 21184683

(51) Int. Cl.
*G01L 19/00* (2006.01)
*G01L 23/24* (2006.01)
*G01L 19/14* (2006.01)

(52) U.S. Cl.
CPC .......... *G01L 23/24* (2013.01); *G01L 19/0038* (2013.01); *G01L 19/14* (2013.01)

(58) Field of Classification Search
None
See application file for complete search history.

(56) References Cited

U.S. PATENT DOCUMENTS 4,489,595 A * 12/1984 Klomp et al.
4,969,354 A * 11/1990 Kosuda et al.
10,100,706 B2 * 10/2018 Zhang

FOREIGN PATENT DOCUMENTS

JP        H03277935 A    12/1991

OTHER PUBLICATIONS

Dec. 13, 2021 European Search Report issued in International Application No. 21184683.

* cited by examiner

*Primary Examiner* — Brandi N Hopkins
*Assistant Examiner* — Nigel H Plumb
(74) *Attorney, Agent, or Firm* — Clements Bernard Walker; Christopher L. Bernard

(57) ABSTRACT

A compact assembly for accurately measuring the air flow in an air intake duct of an internal combustion engine that is easy to manufacture and maintain. The assembly includes a housing with an inlet opening, an outlet opening, a channel with an inner wall defining a predetermined cross-sectional area and a closure member that is movably mounted in the channel between a closed and opened position. A first annular chamber is situated upstream from the closure member and a second annular chamber is placed downstream of the closure member. Each chamber has an inner chamber wall with a number of apertures that are in fluid communication with the channel. A first pressure sensor is connected to the first chamber for measuring a pressure, and a second pressure sensor is connected to the first chamber and the second chamber for measuring a difference in pressure.

12 Claims, 2 Drawing Sheets

PRESSURE SENSOR SYSTEM FOR CHARGE AIR LOAD CONTROL

CROSS-REFERENCE TO RELATED APPLICATION

The present disclosure claims the benefit of priority of co-pending European Patent Application No. 21184683.7, filed on Jul. 9, 2021, and entitled "Pressure Sensor System for Charge Air Load Control," the contents of which are incorporated in full by reference herein.

TECHNICAL FIELD

The present disclosure relates to an assembly for measuring the air flow in an air intake duct of an internal combustion engine, including a housing with an inlet opening and an outlet opening, the housing having a channel with an inner wall defining a predetermined cross-sectional area and a closure member that is movably mounted in the channel between a closed and opened position. The present disclosure also relates to a vehicle having an internal combustion engine including such an assembly.

BACKGROUND

It is known to provide in internal combustion engines a pressure probe sensor that is situated in the intake manifold, upstream of the throttle, and to install a differential pressure sensor downstream of the throttle. Both sensors therein are connected to an air flow control system of the Engine Control Unit (ECU). The air flow control system regulates the throttle position to set the air flow and to meter the amount of air that is charged to the cylinders, on the basis of the pressure probe signal and the differential pressure sensor signal. The known pressure probe for measuring an absolute air pressure projects into the air stream and may form a disturbance and/or restriction for the air flow. Both upstream and downstream sensors have a different lay-out of their inlets which may give rise to inaccuracies of the measured pressures that may affect the throttle control. It is an object of the disclosure to provide a compact and accurate measurement system for measuring the intake air charge in a combustion engine to the cylinders. It is a further object to provide a measurement system that can be easily manufactured and maintained.

SUMMARY

The present disclosure provides a housing including a first annular chamber upstream from the closure member and a second annular chamber downstream of the closure member, the annular chambers extending around the channel, no fluid connection being provided between the chambers, each chamber having an inner chamber wall being defined by the inner wall of the channel, the inner chamber walls each being provided with a number of apertures that are in fluid communication with the channel, a first pressure sensor being connected to the first chamber for measuring a pressure in the first chamber, a second pressure sensor being connected to the first chamber and to the second chamber for measuring a difference in pressure in the first and second chamber.

Two separate annular or ring-shaped chambers are provided upstream and downstream of the throttle plate. The inner walls of the annular chambers are bounded by housing channel inner walls, so that no disturbance of the smooth inside of the throttle duct and housing channel occurs, and even flow properties are obtained. Both pressure sensors may be mounted on the exterior of the housing without parts that project into the channel.

The chambers of the pressure sensors are both integrated in the wall of the duct so that a compact construction is formed that does not cause flow disturbances and the accuracy of the pressure measurement is improved.

The chambers have small openings and are connected to the channel to accurately measure the static pressure in the channel without the formation of deposits on the sensors.

The sensors are placed in close proximity to the closure member, or throttle plate, and do not suffer from time delays between the moment of setting of the throttle position and the pressure measurement.

The cross-section of the duct at each pressure sensor may be equal. The annular chambers of similar shape and volume provide improved accuracy of the pressure measurements that are derived from the signals of both sensors.

The housing may include an insert engaging with an upstream and a downstream end part of the channel and including an inner wall part having the apertures and a bottom wall part defining a bottom of each chamber, the insert being connected to upstream and downstream end parts of the channel.

The annular chambers are formed by an insert that is connected to the throttle housing at the end parts of the throttle channel, to at least allow for easy manufacturing. The housing may be formed by cast metal, such as aluminium, and the insert may be formed of a plastics material, having melting point above 100° C., such as PA6 Polyamide.

An axial distance of the chambers from the closure member may vary from between 3 mm to 5 cm. The close proximity to the closure member allows rapid throttle control with small delay times.

The assembly may include a controller (ECU) connected to each pressure sensor and to an actuator for movement of the closure member, the ECU controlling the position of the closure member in response to the pressure signals of the pressure sensors. The lambda control in the ECU is based on a large number of input signals and an accurate pressure signal is an important parameter for lambda control.

The assembly may be incorporated in a vehicle having an internal combustion engine including a number of cylinders, the assembly being adapted for controlling the air flow to the cylinders. The vehicle may be a hybrid plug in electric vehicle.

BRIEF DESCRIPTION OF THE DRAWINGS

An embodiment of a throttle assembly according to the disclosure will, by way of non-limiting example, be described in detail with reference to the accompanying drawings. In the drawings.

DESCRIPTION OF EMBODIMENTS

Figure 1:
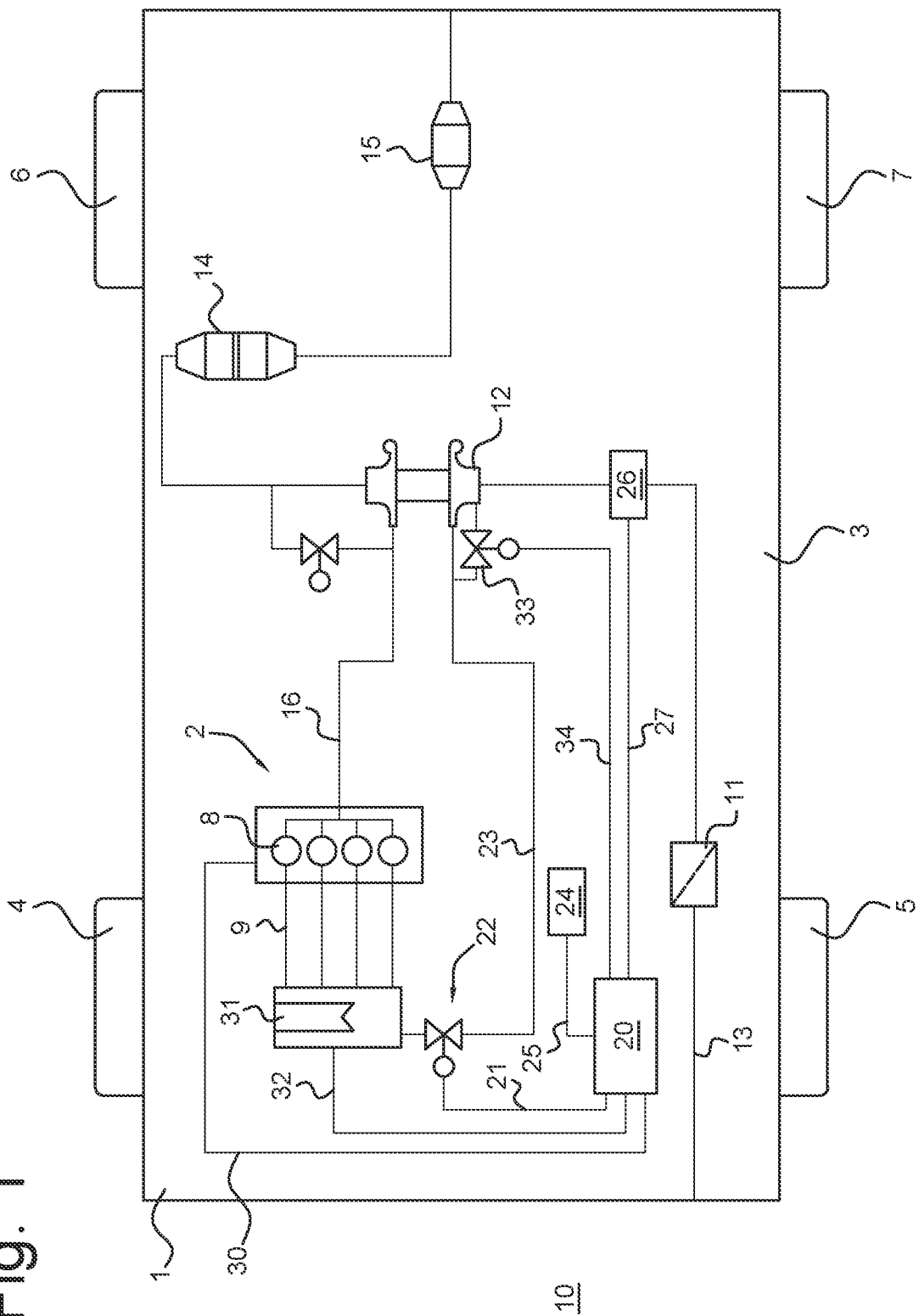
FIG. 1 shows a schematic view of a vehicle with a combustion engine and a throttle assembly according to the disclosure.

FIG. 1 schematically shows a vehicle 1 with a chassis 3 and four wheels 4-7 that are driven by an internal combustion engine 2. The crank shaft and transmission that connect the cylinders 8 of the engine 2 with the wheels 4-7 are not shown. The engine 2 includes a number of cylinders 8 into which fuel is injected by fuel injectors. Air is supplied to the cylinders 8 via an intake manifold 9. The air is drawn in from ambient 10 through an intake duct 13 and passes via an air filter 11 to a turbo compressor 12 that is driven by the exhaust gases from the engine 2.

The exhaust gases leaving the cylinders 8 are transported through an exhaust duct 16 along the turbo compressor 12 and along a three way catalyst TWC 14 for the reduction of the concentration of nitrous oxides NOx and hydrocarbons HC in the exhaust gases. After passing the catalyst 14, a gasoline particulate filter (GPF) 15 removes particulate matter from the exhaust gases before being ejected into the ambient 10.

An engine control unit (ECU) 20 is connected via a signal line 21 to a throttle assembly 22 including a throttle that regulates the air flow to the motor 12 through the air inlet duct 23. The position of the throttle in the assembly 22 is controlled by a number of input parameters, one of which is the position of an accelerator pedal 24. The accelerator pedal 24 is operated by the driver of the vehicle 1, and the accelerator position signal is input into the ECU 20 via signal line 25.

An intake air temperature (IAT) sensor 26 measures the temperature of the air in the intake ducts 13,23 and inputs the temperature value to the ECU 20 via a signal line 27. The assembly 22 provides signals of the differential pressure DP and the manifold absolute pressure MAP to the ECU 20 via the signal line 21. Via a signal line 30, the ECU 20 receives values of the engine speed (RPM) and temperature. The ECU 20 operates a cooling unit 31 that cools the air entering the intake manifold 9, and is connected to the cooling unit 31 via a signal line 32. The ECU furthermore controls the air intake pressure by opening and closing of a valve 33 that bypasses the turbo compressor 12, which valve 33 is connected to the ECU 20 via a signal line 34.

Based on the accelerator pedal signal, the IAT, the engine speed, the desired air/fuel ratio, and the pressures DP and MAP, the ECU 20 determines the amount of air that needs to enter into the inlet manifold 9, and adjusts the position of the throttle in the throttle assembly 22 accordingly.

Figure 2:
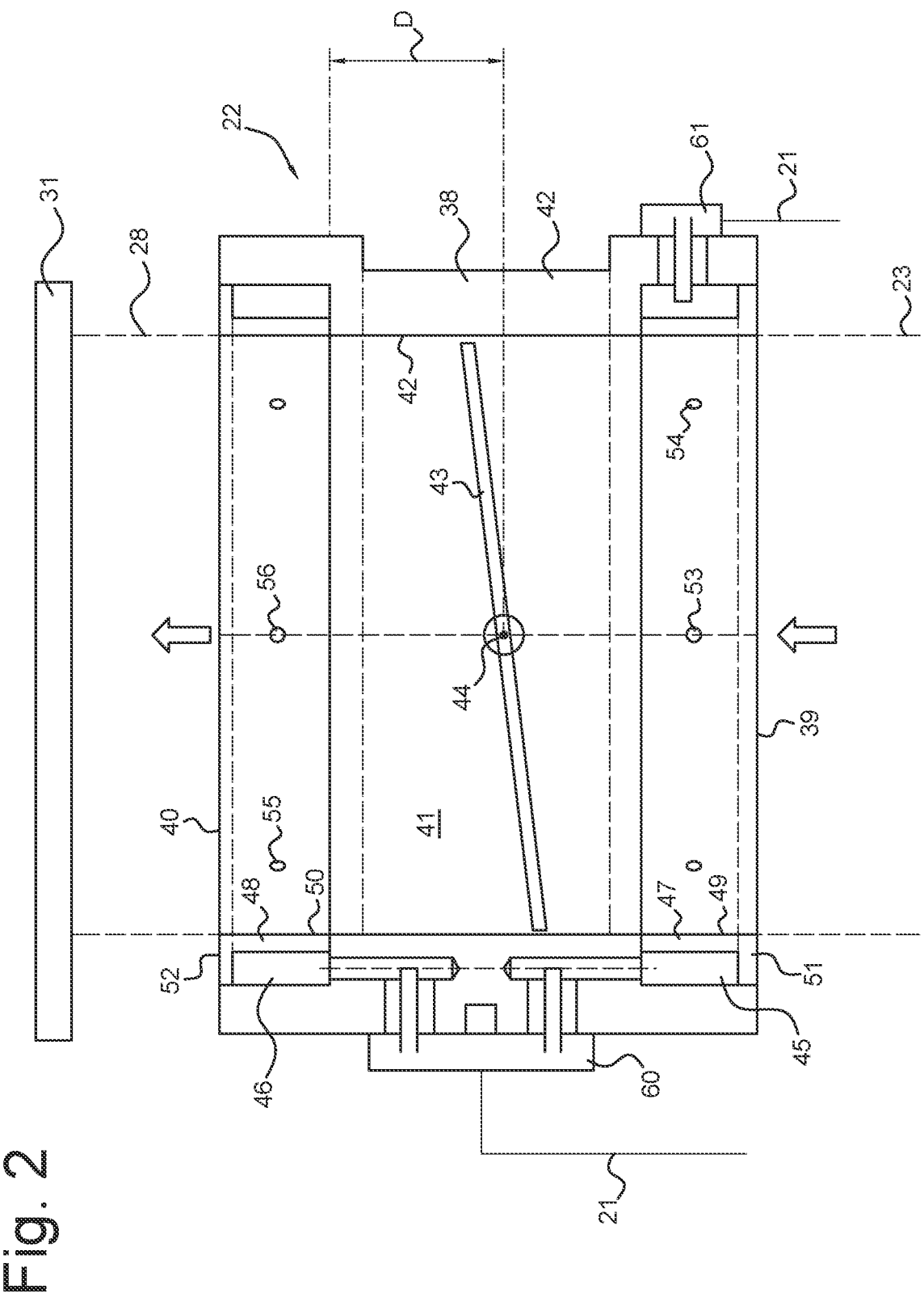
FIG. 2 shows a cross-sectional view of a throttle assembly according to the disclosure.

FIG. 2 shows the throttle assembly 22 with a housing 38 defining a channel 41 with an inner wall 42. The housing 38 has an inlet opening 39 and an outlet opening 40. The cross-section of the channel 41 is circular and of a constant diameter of, for instance, between 10 cm and 20 cm. A throttle plate 43 is provided in the channel 41 and is pivotable about an axis 44 that is perpendicular to the plane of the drawing. The actuator for pivoting of the throttle plate 43 is controlled by the ECU 20, and has not been shown in the drawing. The housing 38 is connected at an upstream side to the intake duct 23 and to a downstream air intake duct 28 that connects to the cooling unit 31 and to the intake manifold 9.

The housing 38 has an upstream annular chamber 45 and a downstream annular chamber 46. The chambers 45, 46 are situated around the channel 41 and are formed in the wall 42 of the housing 38 in a way that no fluid can pass from one chamber to the other. The chambers 45, 46 are each closed by a ring-shaped insert 47, 48. Each insert has a peripheral wall 49,50 and a bottom wall 51, 52. In the peripheral walls 49, 50 a number of apertures 53,54,55,56 are provided for allowing air in the channel 41 to enter into the chambers 45,46. A distance D of the inserts 47,48 from the plane of the pivot axis 44 of the throttle plate 43 may be between 1 cm and 15 cm. Close proximity of the sensors 60,61 to the throttle 43 results in a rapid and accurate response of the ECU 20.

A differential pressure sensor 60 is connected to both chambers 45,46 for measuring a differential pressure DP between the chambers 45,46. A sensor 61 is connected to the chamber 45 for measuring the absolute pressure value, MAP in the channel 41. Both sensors 60,61 are mounted on the exterior of the housing 38, and have no parts that project into the channel 41. The signals of the sensors 60,61 is input to the ECU 20, via the signal line 21, which may include a separate conductor for each sensor.

The housing 38 may be formed of metal, such as cast aluminum. The inserts 47, 48 can be formed of a metal or of a plastic material and may be press fit into the end parts of the housing, or may be connected by an adhesive, a screw connection or any combination thereof.

The invention claimed is:

1. An assembly for measuring air flow in an air intake duct of an internal combustion engine, the assembly comprising: a housing with an inlet opening and an outlet opening, the housing having a channel with an inner wall defining a predetermined cross-sectional area and a closure member that is movably mounted in the channel between a closed and opened position, the housing comprising a first annular chamber upstream from the closure member and a second annular chamber downstream of the closure member, the annular chambers extending around the channel, no fluid connection being provided between the chambers, each chamber having an inner chamber wall being defined by the inner wall of the channel, the inner chamber walls each being provided with a number of apertures that are in fluid communication with the channel, a first pressure sensor being connected to the first chamber for measuring a pressure in the first chamber, a second pressure sensor being connected to the first chamber and to the second chamber for measuring a difference in pressure in the first and second chamber.

2. The assembly according to claim 1, wherein both sensors are mounted on an exterior of the housing, and have no parts that project into the channel.

3. The assembly according to claim 1, wherein the cross-sectional areas of the inner wall at the first and second chamber are equal.

4. The assembly according to claim 1, wherein the housing comprises an insert engaging with an upstream and a downstream end part of the channel and comprising an inner wall part having the apertures and a bottom wall part defining a bottom of each chamber, the inserts being connected to upstream and downstream end parts of the channel.

5. The assembly according to claim 1, wherein an axial distance D of the chambers from the closure member is between 3 mm and 5 cm.

6. The assembly according to claim 1, further comprising a control unit connected to each pressure sensor and to an actuator for movement of the closure member, the control unit controlling the position of the closure member on a basis of pressure signals of the pressure sensors.

7. A vehicle, comprising:
an internal combustion engine comprising cylinders; and
an assembly adapted for controlling air flow to the cylinders, the assembly comprising:
a housing with an inlet opening and an outlet opening, the housing having a channel with an inner wall defining a predetermined cross-sectional area and a closure member that is movably mounted in the channel between a closed and opened position, the housing comprising a first annular chamber upstream from the closure member and a second annular chamber downstream of the closure member, the annular chambers extending around the channel, no fluid connection being provided between the chambers, each chamber having an inner chamber wall being defined by the inner wall of the channel, the inner chamber walls each being provided with a number of apertures that are in fluid communication with the channel, a first pressure sensor being connected to the first chamber for measuring a pressure in the first chamber, a second pressure sensor being connected to the first chamber and to the second chamber for measuring a difference in pressure in the first and second chamber.

8. The vehicle according to claim 7, wherein both sensors are mounted on an exterior of the housing, and have no parts that project into the channel.

9. The vehicle according to claim 7, wherein the cross-sectional areas of the inner wall at the first and second chamber are equal.

10. The vehicle according to claim 7, wherein the housing comprises an insert engaging with an upstream and a downstream end part of the channel and comprising an inner wall part having the apertures and a bottom wall part defining a bottom of each chamber, the inserts being connected to upstream and downstream end parts of the channel.

11. The vehicle according to claim 7, wherein an axial distance D of the chambers from the closure member is between 3 mm and 5 cm.

12. The vehicle according to claim 7, wherein the assembly further comprises a control unit connected to each pressure sensor and to an actuator for movement of the closure member, the control unit controlling the position of the closure member on a basis of pressure signals of the pressure sensors.

* * * * *